Feb. 6, 1923.
C. M. MORRISON.
COFFEE URN.
FILED JUNE 11, 1921.
1,444,262.
2 SHEETS—SHEET 1.
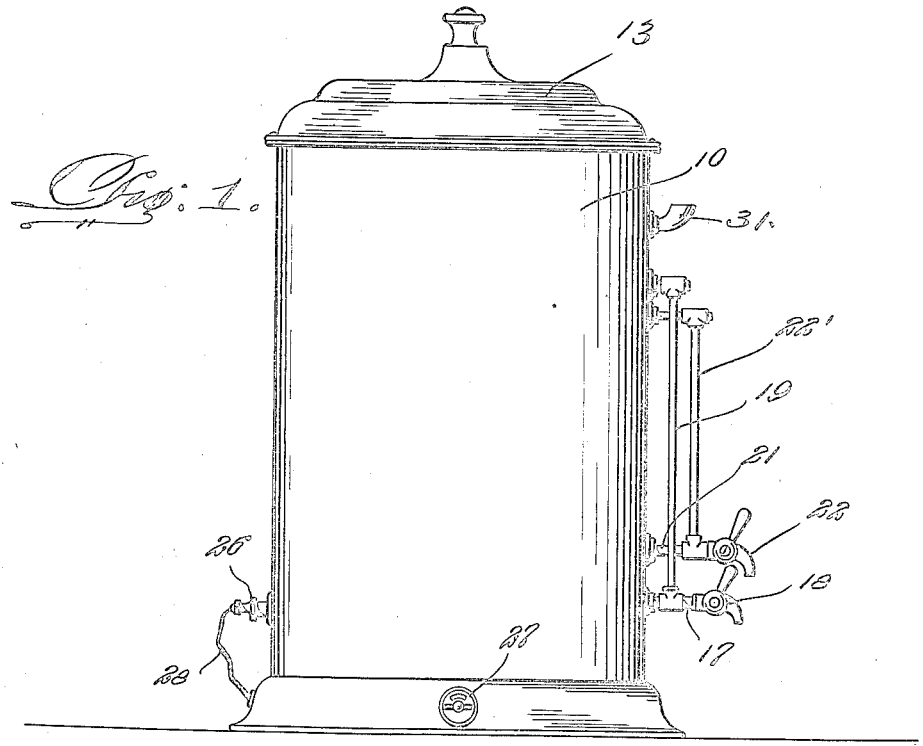
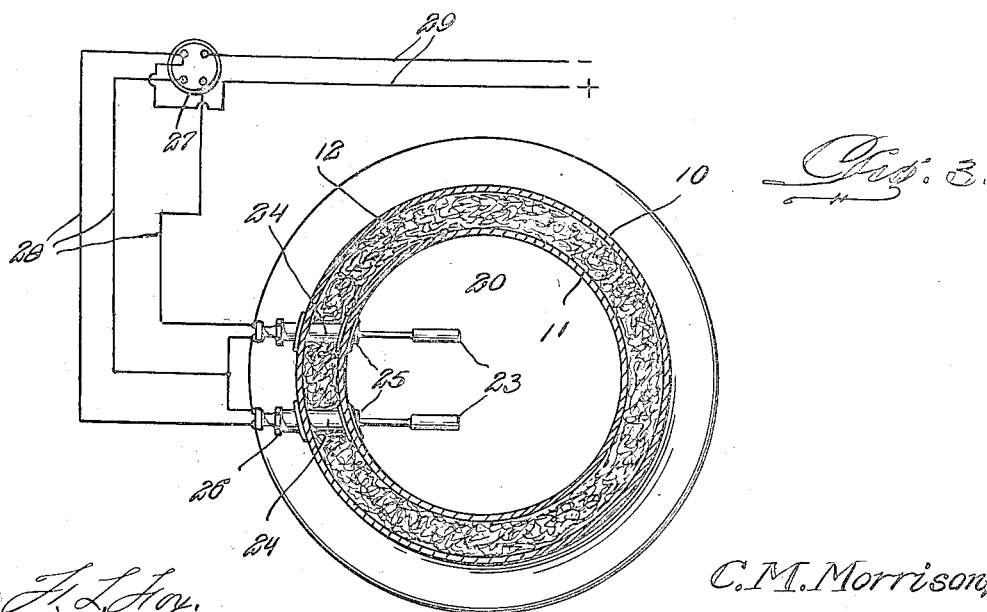
C. M. Morrison,
INVENTOR
BY
ATTORNEY
WITNESSES:

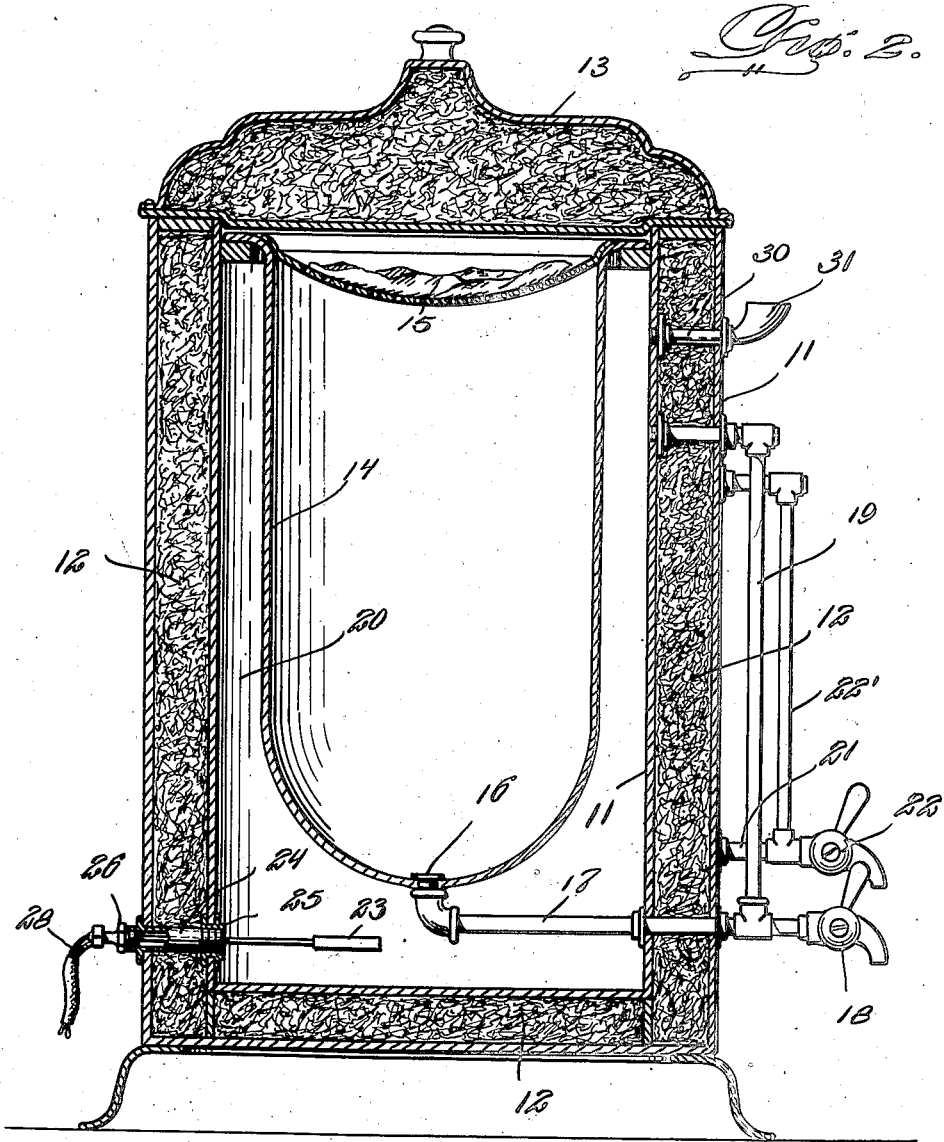

Patented Feb. 6, 1923.

1,444,262

UNITED STATES PATENT OFFICE.

CHARLEY M. MORRISON, OF GLADBROOK, IOWA.

COFFEE URN.

Application filed June 11, 1921. Serial No. 476,896.

*To all whom it may concern:*

Be it known that I, CHARLEY M. MORRISON, a citizen of the United States, residing at Gladbrook, in the county of Tama and State of Iowa, have invented new and useful Improvements in Coffee Urns, of which the following is a specification.

This invention relates to coffee urns and has for an object the provision of an electrically heated urn in which the generated heat may be retained for an appreciable period after the heat supply has been cut off and thus materially reduce the cost of operation of the urn.

Another object of the invention is the provision of an electrically heated urn in which the heating element is arranged so as to permit it to be easily removed and replaced when necessary without requiring the services of a skilled workman.

A further object is the provision of an electrically heated urn which is constructed in a manner to afford a maximum degree of protection to the heating element, so as to insure proper operation and prevent undue wear.

With the above and other objects in view, the invention further includes the following novel features and details of construction, to be hereinafter more fully described, illustrated in the accompanying drawings and pointed out in the appended claim.

In the drawings:—

Figure 1 is an elevation of an urn constructed in accordance with the invention.

Figure 2 is an enlarged vertical sectional view of the same.

Figure 3 is a horizontal section.

Referring in detail to the drawings, wherein like characters of reference denote corresponding parts, the urn as constructed preferably includes an outer casing 10 and an inner casing 11, spaced apart to provide an insulating chamber which is filled with a suitable insulating material 12 of mineral wool or the equivalent. The casing is open at the top and is provided with an insulating cover 13.

Located within the casing is a container 14, which is formed of insulating material, such as porcelain or the like and is adapted to receive water used in making the coffee. Positioned across the top of the container 14 is a sack or receptacle 15 which is designed to contain ground coffee to be acted upon in the well known manner. The bottom of the container 14 is provided with an outlet 16 which communicates with a pipe 17, the latter extending through the walls of the casing and being provided with a discharge cock 18. Extending upwardly from the pipe 17 upon the outside of the casing is a gauge glass 19 to indicate the amount of coffee within the container 14.

The container 14 is spaced from the walls of the casing, that is, from the wall of the inner casing 11 and provides a water chamber 20. This chamber entirely surrounds the container 14 and is adapted to contain water to be heated by a source hereinafter explained for the purpose of supplying heat to the container in the making of coffee. Communicating with the water chamber 20 is a discharge pipe 21, whose outer end is provided with a discharge cock 22, while extending upwardly from the pipe 21 upon the outside of the container is a gauge glass 22', by means of which the amount of water within the urn may be determined.

The water within the chamber 20 is designed to be electrically heated and for this purpose there is provided a pair of horizontally spaced heating elements 23 which are immersed within the water within the chamber 20 so as to heat the latter, as will be readily apparent. In order to provide for the convenient removal of the heating elements 23, the casing of the urn has extending therefrom horizontally spaced sleeves 24. The inner end of these sleeves are exteriorly threaded for engagement with nipples 25 carried by the inner casing 11, while the outer ends of the sleeves 24 are internally threaded for the reception of a plug 26. These plugs are provided with a central opening for the passage of the shanks of the heating elements 23 so that by removing these plugs the elements 23 may be withdrawn or inserted as desired. This provides for the ready renewal of a worn or useless heating element. As stated, the elements 23 are horizontally spaced and are located upon opposite sides of the inner end of the pipe 17. They are immersed in the water contained within the chamber 20 and will last for a relatively long period without burning out and in order to minimize the danger of burning, the elements 23 are located a slight distance below the pipe 21, so that sufficient water will be retained at all times within the chamber 20 to cover these elements.

Located upon the outside of the urn is an electric switch 27 which is connected by means of conductors 28 to the elements 23, while line wires 29 serve to connect the switch with a suitable source of current.

Extending through the casing of the urn is a tubular member or sleeve 30 which is provided with an upwardly extending spout 31. This sleeve may be used for filling the chamber 20 when necessary and will in addition serve to permit of the escape of steam from within said chamber.

The invention is susceptible of various changes in its form, proportions and minor details of construction and the right is herein reserved to make such changes as properly fall within the scope of the appended claim.

Having described the invention what is claimed is:—

An electrically heated coffee urn comprising an open top casing including an outer wall, and an inner wall being spaced from the outer wall providing a chamber therebetween, insulating material compacted in the chamber forming a heat retaining space within the casing, an insulating cover for said top, a porcelain container located within the casing and having an opening in its lower end thereof, said container being wholly disposed within the casing and spaced a substantial distance from the inner wall thereof providing a water chamber thereby, a pipe adapted to communicate with said opening at one end and the opposite end passing through and beyond the adjacent portion of the casing, a discharge cock secured to the outer end of said pipe, a gauge glass extending upwardly from said pipe adjacent its outer end thereof and adapted to indicate the amount of liquid in said container, means arranged above said pipe for ascertaining the amount of liquid in said water chamber, a second discharge cock associated with said means, a tubular member extending through the casing and communicating with said water chamber, an upwardly extending spout secured to the outer end of said tubular member and adapted to fill the water chamber through the medium of said member, said member and spout are also adapted to provide a steam escapement, a heating element arranged within the water chamber below the container and said pipe for the purpose specified, means for detachably securing the heater element in position and means for controlling the heating element.

In testimony whereof I affix my signature.

CHARLEY M. MORRISON.